Dec. 18, 1934.  A. DEUTSCHMANN  1,984,785
ELECTRICAL CONDENSER
Filed July 24, 1931
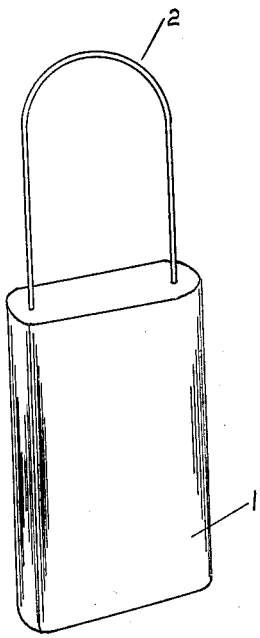
INVENTOR
Arnold Deutschmann
BY
Ezekiel Wolf
ATTORNEY Patented Dec. 18, 1934

1,984,785

UNITED STATES PATENT OFFICE 1,984,785

ELECTRICAL CONDENSER

Arnold Deutschmann, Dorchester, Mass.

Application July 24, 1931, Serial No. 552,986

4 Claims. (Cl. 175—41)

The present invention relates to improvements in electrical condensers, in particular to condensers of small volume and large capacities which are usually wound of numerous layers or turns of conductive material between which a dielectric is used. A type of condenser to which the present invention applies is the so called paper condenser which is composed of layers of metal foil with paper in between, the layers being wound in a coil or pressed closely together. The invention is also applicable to mica condensers made in the same way, and in fact to most of the condensers of fixed capacities commonly used in radio circuits.

It is particularly applicable to condensers which in the process of manufacture are dipped in a compound in order to improve their breakdown voltage. It is quite common to dip such a condenser in a bath of hot wax or oil, sometimes under pressure, and for this purpose the present invention serves a useful purpose.

The condenser which may be of any of the types described above, is made in the usual way that other condensers were formerly made to the point of putting on the terminal conductive leads. Formerly single leads were attached to each terminal. According to the present invention instead, a single piece of wire is attached at one end to one terminal and at the other end to the other terminal, thus making a loop. The condensers may then be impregnated by stringing them on a pole or hanger and dropping them in the impregnating bath. When properly impregnated the hanger or pole may be raised and the condensers allowed to drip and dry.

The condenser is shown in the attached drawing. 1 indicates the condenser itself which may be of any of the usual types and 2 indicates the terminal lead which is looped from one terminal to the other. The terminal lead is preferably a flexible conductor.

The condenser with the terminal lead as shown is particularly useful for the mechanic or electrician to use. He determines the place the condenser is to be used and then with pliers cuts the single lead at the point that is most advantageous to give him the proper lengths he wants. He may desire leads of equal lengths, or he may want a long lead in which case he cuts the wire in the place he finds the best. The loop itself is made large enough so that sufficient wire is provided for ordinary purposes, it being considerably longer than the length from terminal to terminal of the condenser. If there is too much wire the operator can cut the lead for ends that are of the length he desires. This particular type of terminal lead saves wire because it does not have to be made twice as long as the ordinary individual terminal leads, and further, often saves the electrician the trouble of attaching an extra piece of wire to one terminal if he should need this exceptionally long.

In the manufacture there is also saved the expense of providing special means for suspending the condensers such as clips and further the condenser in the present method of construction can be handled much more quickly. Where formerly the condensers were put in racks or traps while impregnating for the most part, in the present method of handling they are suspended, and provide a better means for allowing the wax to drip off.

I claim:

1. In combination with an electrical condenser, a single wire element permanently connected at its ends to the condenser electrodes respectively.

2. In combination with an electrical condenser a single yielding wire element permanently connected at its ends to the condenser electrodes respectively.

3. In combination with an electrical condenser a single yielding wire element permanently connected at its ends to the condenser electrodes, said wire being of a length considerably in excess of the length necessary to connect said condenser electrodes.

4. In combination with an electrical condenser, a single whole yielding wire having its ends attached to opposite condenser electrodes and a coating material applied to said condenser after the attachment of the wire.

ARNOLD DEUTSCHMANN.